United States Patent
Smith

(10) Patent No.: US 9,357,103 B2
(45) Date of Patent: May 31, 2016

(54) SYSTEMS AND METHODS FOR CONTROLLING MEDIA DEVICES

(71) Applicant: Control4 Corporation, Salt Lake City, UT (US)

(72) Inventor: Wallace Eric Smith, Pleasant Grove, UT (US)

(73) Assignee: Control4 Corporation, Salt Lake City, UT (US)

( * ) Notice: Subject to any disclaimer, the term of this patent is extended or adjusted under 35 U.S.C. 154(b) by 0 days.

(21) Appl. No.: 13/745,626

(22) Filed: Jan. 18, 2013

(65) Prior Publication Data

US 2013/0188097 A1 Jul. 25, 2013

Related U.S. Application Data

(60) Provisional application No. 61/589,100, filed on Jan. 20, 2012.

(51) Int. Cl.

| G06F 3/00 | (2006.01) |
|---|---|
| G06F 13/22 | (2006.01) |
| G06F 12/00 | (2006.01) |
| G06F 13/14 | (2006.01) |
| G06F 13/38 | (2006.01) |
| G06F 13/00 | (2006.01) |
| G09G 5/00 | (2006.01) |
| G06F 3/02 | (2006.01) |
| H04N 5/00 | (2011.01) |
| H04N 5/781 | (2006.01) |
| H04L 12/28 | (2006.01) |
| H04L 12/54 | (2013.01) |

(52) U.S. Cl.
CPC .............. *H04N 5/00* (2013.01); *H04L 12/2816* (2013.01); *H04N 5/781* (2013.01); *H04L 12/56* (2013.01)

(58) Field of Classification Search
CPC .......... H04N 5/00; H04N 5/781; H04L 12/56; H04L 12/2816
USPC ......... 710/5, 11, 220, 240, 316; 345/156, 168
See application file for complete search history.

(56) References Cited

U.S. PATENT DOCUMENTS

| 5,809,533 | A * | 9/1998 | Tran | G06F 13/4217 710/311 |
|---|---|---|---|---|
| 7,984,315 | B2 * | 7/2011 | Ito | 713/324 |
| 8,281,045 | B2 * | 10/2012 | Higuchi et al. | 710/8 |
| 8,375,147 | B2 * | 2/2013 | Kamohara | 710/3 |
| 8,504,638 | B2 * | 8/2013 | Freundlich et al. | 709/208 |
| 2003/0112796 | A1 * | 6/2003 | Kwan | G10L 25/90 370/352 |
| 2004/0175097 | A1 * | 9/2004 | Caspi | H04L 12/2803 386/232 |
| 2005/0228909 | A1 * | 10/2005 | Chen | H04N 5/85 710/62 |
| 2006/0294268 | A1 * | 12/2006 | Yang | G06F 3/165 710/62 |
| 2007/0073958 | A1 * | 3/2007 | Kalayjian | G06F 13/385 710/313 |
| 2007/0116024 | A1 * | 5/2007 | Zhang | H04L 12/5693 370/412 |
| 2009/0041436 | A1 * | 2/2009 | Kamimura | G11B 27/102 386/236 |
| 2010/0321202 | A1 * | 12/2010 | Laflamme et al. | 340/825.69 |
| 2011/0099415 | A1 * | 4/2011 | Terauchi et al. | 714/5.1 |
| 2011/0167176 | A1 * | 7/2011 | Yew et al. | 710/6 |
| 2011/0283129 | A1 * | 11/2011 | Guillerm | G09G 5/006 713/324 |
| 2011/0314324 | A1 * | 12/2011 | Ozdemir | 713/600 |

* cited by examiner

*Primary Examiner* — Idriss N Alrobaye
*Assistant Examiner* — Getente A Yimer
(74) *Attorney, Agent, or Firm* — Austin Rapp & Hardman

(57) ABSTRACT

A method for controlling media devices by an electronic device is described. The method includes receiving a first control signal from a first media device in a first media device control network. The method also includes generating a second control signal based on the first control signal and a second media device in a second media device control network. The method further includes sending the second control signal to the second media device.

14 Claims, 11 Drawing Sheets

SYSTEMS AND METHODS FOR CONTROLLING MEDIA DEVICES

RELATED APPLICATIONS

This application is related to and claims priority from U.S. Provisional Patent Application Ser. No. 61/589,100, filed Jan. 20, 2012, for "ELECTRONIC DEVICE FOR CONTROLLING MEDIA DEVICES," which is incorporated herein by reference.

TECHNICAL FIELD

The present disclosure relates generally to electronic devices. More specifically, the present disclosure relates to systems and methods for controlling media devices.

BACKGROUND

In recent years, the price of electronic devices has decreased dramatically. In addition, the size of electronic devices has continued to decrease. This has allowed electronic devices to be cheaper and more capable. For example, digital video disc (DVD) players, large screen televisions (TVs), multi-carousel compact disk (CD) and DVD players, Motion Picture Experts Group 1 (MPEG-1) audio layer (MP3) players, video game consoles and similar consumer electronic items have become more widely available while continuing to drop in price. The decreasing prices and increasing types of electronic devices have packed today's homes and businesses with modern conveniences. Typical homes and businesses now include more electronic devices than ever before.

While these electronic devices may provide convenience and entertainment, many also require control. For example, some electronic devices are used for accessing and/or displaying media (e.g., audio and/or visual content) on media devices (TV monitors, computer monitors, etc.). Various limitations of media devices may make displaying media problematic. For example, incompatible media devices may impede transfer of information from a media source device to a media display device. As illustrated by this discussion, controlling media devices may be beneficial.

DETAILED DESCRIPTION

Figure 1:
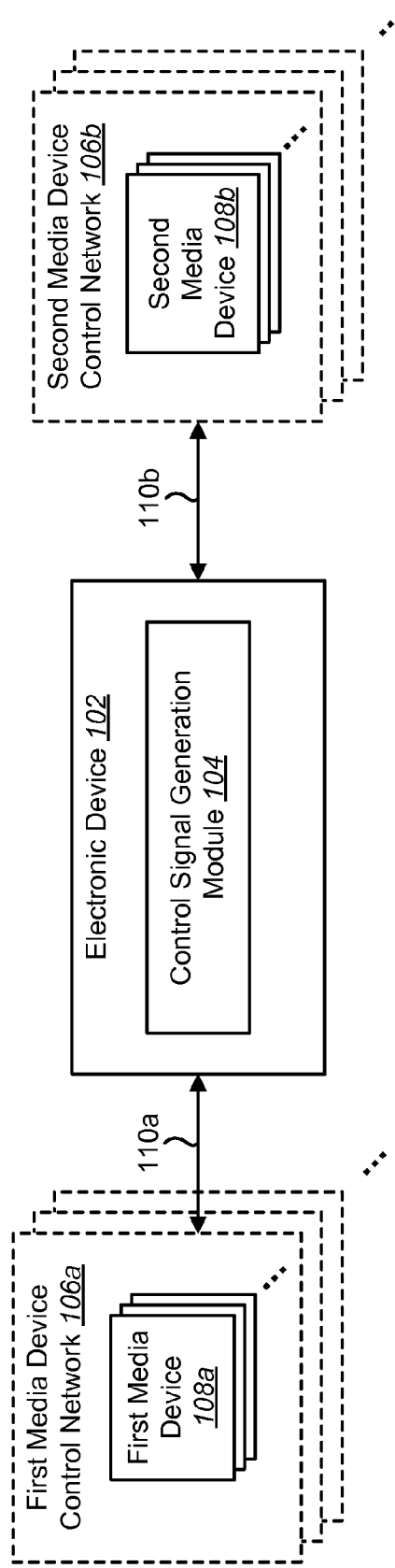
FIG. 1 is a block diagram of one configuration of an electronic device in which systems and methods for controlling media devices may be implemented.

A method for controlling media devices by an electronic device is described. The method includes receiving a first control signal from a first media device in a first media device control network. The method also includes generating a second control signal based on the first control signal and a second media device in a second media device control network. The method further includes sending the second control signal to the second media device.

Generating the second control signal may include spoofing a compatible media device. The first media device may be at least one of a media display device, a media source device and/or a media switch device. The second media device may be at least one of a media display device, a media source device and/or a media switch device. The first media device control network may be functionally decoupled from the second media device control network. The first media device control network and the second media device control network may utilize separate addressing parameters. At least one of the first control signal and the second control signal may be based on a media device manufacturer. At least one of the first control signal and the second control signal may be a Consumer Electronics Control (CEC) command.

An electronic device for controlling media devices is described. The electronic device includes a processor, memory in electronic communication with the processor and instructions stored in the memory. The instructions are executable to receive a first control signal from a first media device in a first media device control network. The instructions are also executable to generate a second control signal based on the first control signal and a second media device in a second media device control network. The instructions are further executable to send the second control signal to the second media device.

Another method for controlling media devices by an electronic device is described. The method includes receiving a control indication from a control system. The method also includes generating a first control signal based on the control indication and a first media device. The method further includes sending the first control signal to the first media device.

Another electronic device for controlling media devices is described. The electronic device includes a processor, memory in electronic communication with the processor and instructions stored in the memory. The instructions are executable to receive a control indication from a control system. The instructions are also executable to generate a first control signal based on the control indication and a first media device. The instructions are also executable to send the first control signal to the first media device.

A method for discovering a media device configuration by an electronic device is described. The method includes discovering a media device in a media device control network.

The method also includes determining a driver associated with the media device. The method also includes discovering a configuration of the media device. The method further includes controlling the media device.

An electronic device for discovering a media device configuration is described. The electronic device includes a processor, memory in electronic communication with the processor and instructions stored in the memory. The instructions are executable to discover a media device in a media device control network. The instructions are also executable to determine a driver associated with the media device. The instructions are also executable to discover a configuration of the media device. The instructions are further executable to control the media device.

Various configurations of the systems and methods disclosed herein are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the figures, is not intended to limit scope, as claimed but is merely representative of the systems and methods.

FIG. 1 is a block diagram of one configuration of an electronic device 102 in which systems and methods for controlling media devices 108a-b may be implemented. The electronic device 102 may be linked or coupled to media devices 108a-b that may transmit/receive media content. For instance, the electronic device 102 may be linked to the media devices 108a-b with High-Definition Multimedia Interface (HDMI) cables. Examples of media devices 108a-b include media source devices, media display devices and media switch devices. Media source devices may be the source of media content (for being displayed, for example). Examples of media source devices include Blu-ray® players, DVD players, cable boxes, satellite receivers, digital video recorders (DVRs), wireless streaming devices (e.g., Apple TV®, Roku®, Logitech Revue®, etc.), gaming devices (e.g., Xbox®, PlayStation®, Wii®, etc.), mobile phones, cameras, etc. Media display devices may display media content (received from a media source device, for example). Examples of media display devices include televisions (TVs) (e.g., organic light emitting diode (OLED) televisions, liquid crystal display (LCD) televisions, plasma televisions, projection televisions, tube televisions, etc.), projectors (e.g., lamp projectors, light emitting diode (LED) projectors, laser projectors, etc.), monitors, smart phones, tablets, personal digital assistants (PDAs), etc. Media source devices may send or pass the media content to media display devices. For instance, a plasma television may display media content received from a Blu-ray® player. Media switch devices may replicate signals (e.g., content signals, control signals, etc.). In some configurations, a media switch device may have multiple media device inputs and a single media device output. For example, a media switch device may be a five HDMI input to one HDMI output (e.g., a five to one) switch. In some configurations, the inputs of a media switch device may be connected to one or more media devices (for example, media source devices) and the output of the media switch device may be connected to the electronic device 102.

In some implementations, the first media device 108a and the second media device 108b may be of different types. For example, the first media device 108a may be a media display device and the second media device 108b may be a media source device. In another example, the first media device 108a may be a media source device and the second media device 108b may be a media display device. In some configurations, the first media device 108a and the second media device 108b may originate from different manufacturers (e.g., vendors). For example, the first media device 108a may originate from a first manufacturer and the second media device 108b may originate from a second manufacturer.

In some configurations, the electronic device 102 may enable control to/from multiple media devices 108a-b (in separate media device control networks 106a-b, for example). It should be noted that with HDMI Consumer Electronics Control (CEC), only one media display device may be allowed in a media device control network. Thus, one or more media source devices may be limited to sending/receiving control signals to the single media display device. However, the electronic device 102 as described herein may enable control to/from multiple media display devices (e.g., first media devices 108a). Accordingly, one or more media source devices (e.g., second media device(s) 108b) may send/receive control signals to one or more media display devices (e.g., first media device(s) 108a). In some implementations, the electronic device 102 may limit the visibility between the first media device(s) 108a and the second media device(s) 108b. For example, the electronic device 102 may limit the first media device 108a to see only the electronic device 102 and not the second media device 108b or any other media device. Similarly, the electronic device 102 may limit the second media device 108b to see only the electronic device 102 and not the first media device 108a or any other media device. In some configurations, the electronic device 102 may not strictly repeat or rebroadcast signals between the media devices 108a-b in order to limit visibility. In particular, the electronic device 102 may not repeat the physical address provided by a media device 108.

The media devices 108a-b may be included in one or more media device control networks 106a-b. For example, the first media device 108a may be included in a first media device control network 106a. Similarly, the second media device 108b may be included in a second media device control network 106b. In some implementations, each media device 108a-b may correspond to one media device control network 106a-b. In other words, each media device control network 106a-b may include one media device 108a-b. It should be noted that the electronic device 102 may be included in (e.g., coupled to) each of the media device control networks 106a-b. For example, the electronic device 102 may have an address within each of the separate media device control networks 106a-b. In some configurations, the electronic device 102 may appear to the media devices 108 as another media device, even though the electronic device 102 may or may not be a media device (e.g., media source device, media display device, switch, etc.). For example, the electronic device 102 may send a signal to the first media device 108a (e.g., a media display device) indicating that the electronic device 102 is a media source device and/or may be addressed as a media source device in one or more of the media device control networks 106a-b. In some configurations, each of the media device control networks 106 may include only a single media device 108 and the electronic device 102.

The electronic device 102 may be coupled to the media device control networks 106a-b via connections 110a-b. The connections 110a-b may be any connections suitable for coupling the electronic device 102 to the media device control networks 106a-b. Examples of connections 110a-b may include High Definition Multimedia Interface (HDMI) cables and Ethernet cables (for passing media and/or HDMI signals). The electronic device 102 may transmit/receive information from the media device control networks 106*a-b* via the connections 110*a-b*. For example, the electronic device 102 may receive a control signal from the first media device 108*a* that is located in the first media device control network 106*a*. Additionally, the electronic device 102 may send a control signal to the second media device 108*b* that is located in the second media device control network 106*b*. Examples of control signals include Consumer Electronics Control (CEC) commands and commands that may be sent over an HDMI connection. Accordingly, at least one of the media device control networks 106*a-b* may utilize CEC over an HDMI connection.

The media device control networks 106*a-b* may couple one or more media devices 108*a-b* to the electronic device 102. For example, the first media device control network 106*a* may include one or more first media devices 108*a* and the electronic device 102. Similarly, the second media access control network 106*b* may include one or more second media devices 108*b* and the electronic device 102. The first media device 108*a* and the second media device 108*b* may not be in the same media device control network 106*a*. In this example, the electronic device 102 may act as an intermediary for transmissions (of control signals, for example) between the first media device 108*a* and the second media device 108*b* (by virtue of being included in both media device control networks 106*a-b*).

The media device control networks 106*a-b* may include one or more addressing parameters. For example, the media device control networks 106*a-b* may include logical addressing parameters and physical addressing parameters. An example of a logical addressing parameter is given as follows. A CEC logical addressing parameter may require that a single media device 108 (e.g., a media display device) located on a media device control network 106 be assigned the lowest logical address (e.g., "0"). Thus, a media device control network 106 that utilizes CEC may support one media display device 108. For example, the first media device control network 106*a* may only support one media display device 108*a* (e.g., a television, monitor, etc.).

A physical addressing parameter may identify the media devices 108*a-b* on the media device control networks 106*a-b*. For example, a CEC physical addressing parameter may identify a media device 108*a-b* based on a layer of a tree structure of media devices 108*a-b* to an octet (of a four-octet address, for example). Accordingly, a media device control network 106 that utilizes CEC may support four layers of networking. An example of a media device control network 106*a-b* physical addressing is given as follows. A media device 108 (e.g., a Blu-ray® player) that is coupled to a first HDMI port on a television may have an address of "1.0.0.0." An HDMI switch that is coupled to a second HDMI port on the television may have an address of "2.0.0.0." A second media device 108*b* (e.g., a digital video recorder (DVR)) that is coupled to a first HDMI port of the HDMI switch may have an address of "2.1.0.0."

In some implementations, the first media device control network 106*a* and the second media device control network 106*b* may incorporate separate addressing parameters. For example, the first media device control network 106*a* may incorporate a first set of addressing parameters and the second media device control network 106*b* may incorporate a second set of addressing parameters that is distinct from the first set of addressing parameters. For example, the electronic device 102 may decouple the addressing of the first media device control network 106*a* and the second media device control network 106*b*.

The electronic device 102 may include a control signal generation module 104 for generating control signals. A control signal may be an instruction directing a media device 108*a-b* to perform an operation. For example, a control signal may instruct the second media device 108*b* (e.g., a DVD player) to "pause" media content. Other examples of control signals include a "stop" command, a "play" command, a "fast forward" command, a "rewind" command, a "menu" command, navigation (e.g., up, down, left, right) commands, a "select" command, a "skip" command, a "go to" command, a "return" command, a "power on" command, a "power off" command, an "input select" command, etc. The control signal may be a CEC command. The electronic device may direct a control signal to a media device 108*a-b* based on the media device's 108*a-b* physical address.

The control signal generation module 104 may generate a control signal based on a received control signal (e.g., a CEC command). For example, the control signal generation module 104 may generate a second control signal (to be sent to the second media device 108*b*, for example) based on a first control signal (received from the first media device 108*a*, for example). In some implementations, the control signal generation module 104 may format the first control signal to allow the second media device 108*b* to receive and/or execute the content (e.g., command) of the first control signal. An example is given as follows. In some cases, the second media device 108*b* may include a limitation that allows the second media device 108*b* to only communicate, via CEC commands, with media devices 108*a-b* of the same manufacturer. In other words, the second media device 108*b* may not communicate with the first media device 108*a* if the first media device 108*a* is not identified with the same manufacturer. For instance, a media device 108*a-b* may require that the first three octets (associated with the organizationally unique identifier (OUI), for example) of a hardware Media Access Control (MAC) address (e.g., Institute of Electrical and Electronics Engineers (IEEE) MAC-48 address) be the same before the media device 108*a-b* will communicate over a media device control network 106*a-b* (e.g., CEC network). In this example, the electronic device 102 may not directly rebroadcast the first control signal. Rather, the control signal generation module 104 may translate the first control signal into a format that may allow the second media device 108*b* to receive it (e.g., the second control signal).

It should be noted that the control signal generation module 104 may generate any number of control signals to be transmitted between any number of media devices 108*a-b*. For example, in addition to generating the second control signal, the control signal generation module 104 may generate a third control signal (based on a third media device (not shown) and the first control signal) to be sent to a third media device (not shown). Similarly, the control signal generation module 104 may generate a fourth control signal (based on the first media device 108*a* and a control signal originating from the second media device 108*b*) to be sent to the first media device 108*a*. Accordingly, multiple media source devices may communicate with multiple media display devices in some configurations.

Some configurations of the systems and methods disclosed herein may utilize multiple electronic devices 102. In one approach, for example, each of the media devices 108 and/or each of the media device control networks 106 may have an associated electronic device 102. These multiple electronic devices 102 may communicate and/or coordinate with each other over a network (e.g., an Internet Protocol (IP) network, a Local Area Network (LAN), the Internet, etc.). For example, the electronic devices 102 may relay control signals in order to bridge the media control networks. In one example, the first media device 108a may send a first control signal via the first connection 110a to a first electronic device 102. The first electronic device may relay the first control signal to a second electronic device 102 (via a wireless LAN (e.g., IEEE 802.11 or Wi-Fi network), for example). The second electronic device 102 may then generate and send a second control signal based on the first control signal and the second media device 108b. While the systems and methods disclosed herein are generally described in terms of a single electronic device (e.g., electronic devices 102, 302, 502, 602 described in connection with FIGS. 1, 3, 5 and 6, etc.), it should be noted that they may be implemented with multiple electronic devices in some configurations as described by the foregoing.

Figure 2:
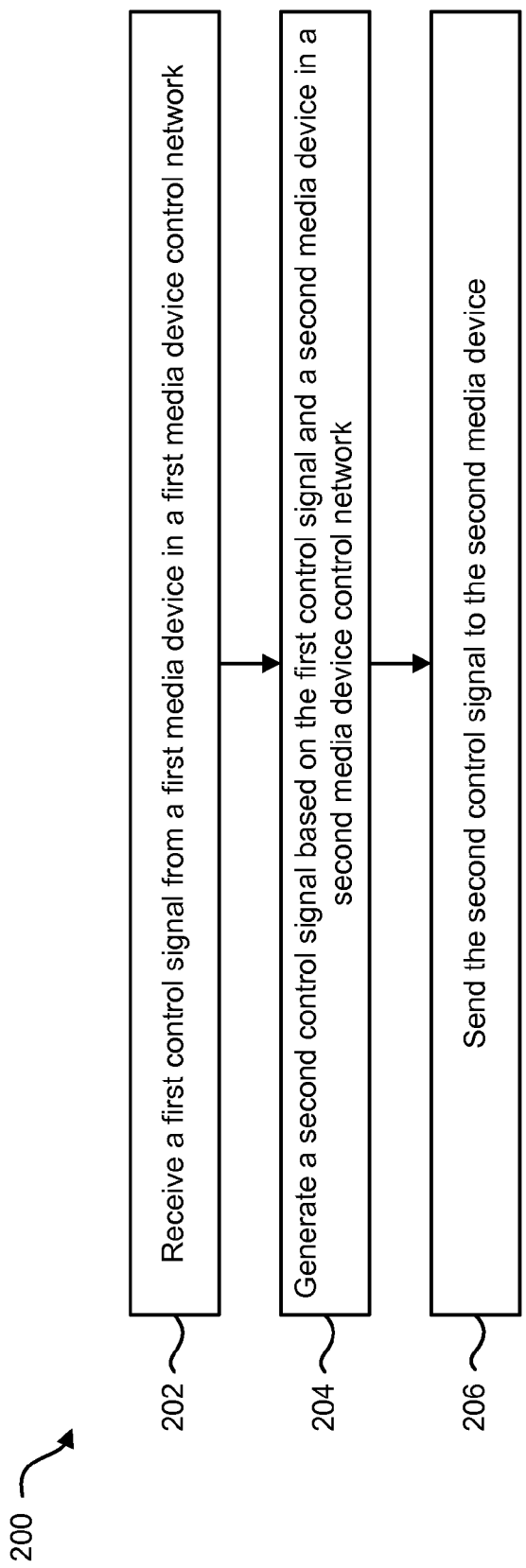
FIG. 2 is a flow diagram illustrating one configuration of a method for controlling media devices by an electronic device.

FIG. 2 is a flow diagram illustrating one configuration of a method 200 for controlling media devices 108a-b by an electronic device 102. The electronic device 102 may receive 202 a first control signal from a first media device 108a in a first media device control network 106a. For example, the first control signal may be an HDMI-CEC deck control command (e.g., a "play" command). The first control signal may also be based on the manufacturer of the first media device 108a. For example, the first control signal may include an identifier that indicates the first media device 108a manufacturer.

The electronic device 102 may generate 204 a second control signal based on the first control signal and the second media device 108b in a second media device control network 106b. For example, the electronic device 102 may generate 204 a second control signal based on a deck command (e.g., "play") received from a television and based on a Blu-ray® player (e.g., based on the manufacturer of, physical address of, expected message format for and/or driver software for the second media device 108b).

Generating 204 the second control signal based on the second media device 108b may include generating 204 a control signal that may allow the second media device 108b to receive control signals originating from the first media device 108a. For example, as stated above, a media device 108a-b manufacturer may limit the transmission and/or reception of control signals so that control signals may only be transmitted and/or received between media devices 108a-b that are from the same manufacturer. In this case, generating 204 the second control signal may allow the second media device 108b to receive and/or execute the control signal notwithstanding that the second media device 108b originates from a different manufacturer than the first media device 108a. The electronic device 102 may allow the second media device 108b to receive the control signal by manipulating the information that is passed to the second media device 108b. For example, the electronic device 102 may generate a code (that includes the first three octets of a hardware MAC address, for example) that allows the second media device 308b to receive the content of the first control signal. In other words, the second control signal may allow the first control signal (e.g., a "play" command received from the first media device 108a) to be transmitted to the second media device 108b (as the second control signal) notwithstanding the manufacturer of the media devices 108a-b.

In some implementations, generating 204 the second control signal may include formatting the control signal so that the second media device 108b may receive it. For example, the electronic device 102 may not simply re-broadcast the first control signal, but may translate the first control signal into the second control signal. Translating the first control signal into the second control signal may include removing information from and/or adding information to the first control signal (a manufacturer code, for example). For instance, generating 204 the second control signal may include translating a command of the first control signal into a command in the second control signal that is compatible with the second media device 108b. For example, the second media device 108b may utilize a different code than the first media device 108a for a particular operation. In this case, the electronic device 102 may generate a code for the second media device 108b for an operation indicated with a different code in the first control signal. In another example, the capabilities or supported commands between the media devices 108a-b may be different. In this case, the electronic device 102 may generate 204 the second control signal with one or more commands that approximate a command of the first control signal, provide a different command and/or notify a user of a missing capability (by commanding a message to be displayed, for example).

It should be noted that the electronic device 102 may obtain information (e.g., address, manufacturer code, etc.) regarding a media device 108 in order to receive 202 and/or generate 204 control signals. For example, the electronic device 102 may request and receive one or more physical addresses from the media device(s) 108. Additionally or alternatively, the electronic device 102 may request and receive one or more manufacturer codes from the media device(s) 108. In some configurations, the information may be alternatively obtained during discovery (e.g., when the electronic device 102 is initially coupled to the media device(s) 108) or when the information is broadcast by the media device(s) 108. Accordingly, generating 204 a second control signal may be based on the content (e.g., command) of the first control signal and based on the second media device 108b (e.g., the physical address and/or manufacturer code of the second media device 108b).

The electronic device 102 may send 206 the second control signal to the second media device 108b. For example, the electronic device 102 may send 206 the second control signal (using spoofing, for example) to the media source device (e.g., the second media device 108b). It should be noted that the method 200 may additionally or alternatively be applied for generating and sending a control signal (using spoofing, for example) to the first media device 108a (based on a control signal originating from the second media device 108b and based on the first media device 108a, for example).

Figure 3:
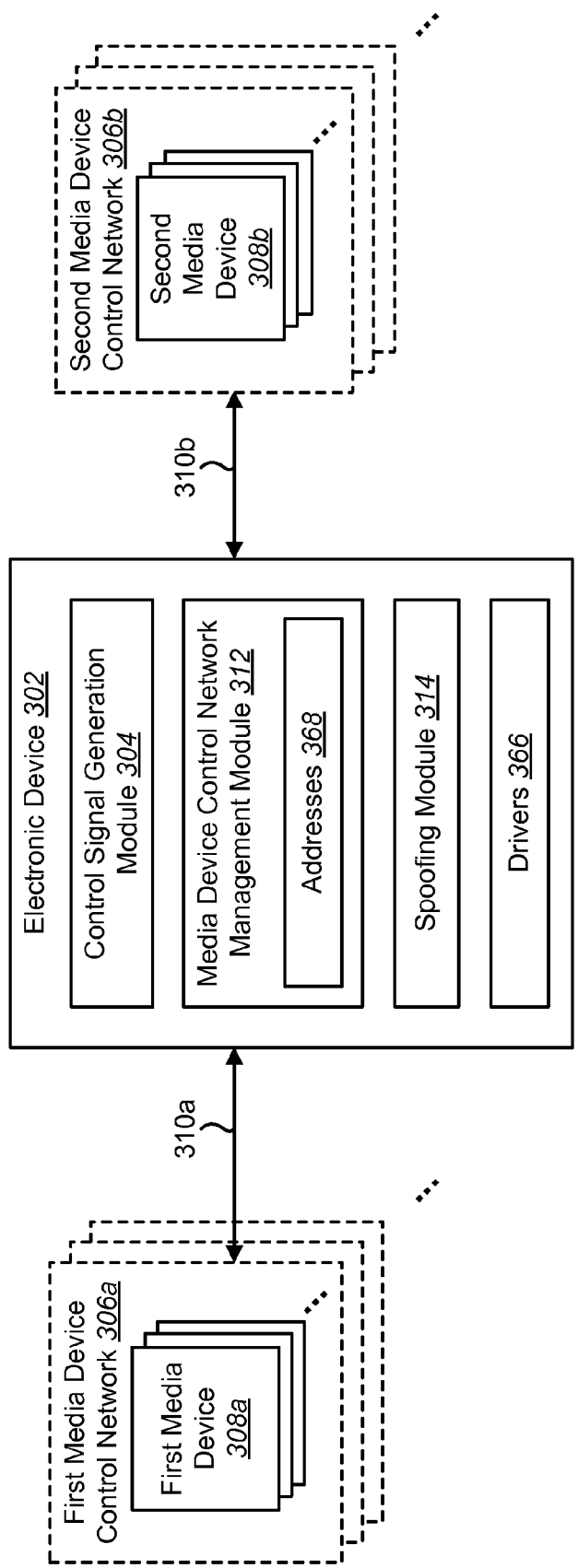
FIG. 3 is a block diagram illustrating a more specific configuration of an electronic device in which systems and methods for controlling media devices may be implemented.

FIG. 3 is a block diagram illustrating a more specific configuration of an electronic device 302 in which systems and methods for controlling media devices 308a-b may be implemented. The electronic device 302 may be an example of the electronic device 102 described in connection with FIG. 1. The electronic device 302 may include a control signal generation module 304 that may be an example of the control signal generation module 104 described in connection with FIG. 1. In some configurations, the control signal generation module 304 may utilize and/or operate in conjunction with a spoofing module 314 in order to generate control signals as described in greater detail below. The electronic device 302 may be coupled to one or more media device control networks 306a-b and corresponding media devices 308a-b that may be examples of corresponding elements described in connection with FIG. 1. The electronic device 302 may be coupled to the media device control networks 306a-b via connections 310a-b that may be examples of the connections 110a-b described in connection with FIG. 1.

The electronic device 302 may include a spoofing module 314 for enabling the electronic device 302 to spoof one or more compatible media devices. In some configurations, the spoofing module 314 may operate in conjunction with and/or be included in the control signal generation module 304. The spoofing module 314 may enable the electronic device 302 to appear as (e.g., act as, communicate as, respond as, etc.) a media device that is compatible with one or more of the media devices 308 in the media device control network(s) 306. For example, the electronic device 302 may spoof (e.g., impersonate) a compatible media device in communications with one or more of the media devices 308a-b. For instance, the electronic device 302 may be able to communicate with the second media device 308b (e.g., a receiver, cable box, DVD player, etc.) as if the electronic device 302 were a compatible media device (e.g., a TV, monitor, etc.).

Spoofing a compatible media device may include utilizing an assumed or fabricated address (e.g., physical and/or logical address) in communications with one or more of the media devices 308a-b. The assumed address may be based on a media device 308. For example, if the first media device 308a is a media display device (e.g., a TV), the electronic device 302 may spoof (e.g., impersonate) a compatible media source device (e.g., a receiver, cable box, DVD player, Blu-ray player, etc.) by assuming and sending a physical address (e.g., "1.0.0.0") that indicates a compatible media source device in communications with the first media device 308a. Additionally or alternatively, if the second media device 308b is a media source device, the electronic device 302 may spoof a compatible media display device (e.g., a TV, monitor, etc.) by assuming and sending a physical address (e.g., "0.0.0.0") that indicates a compatible media display device in communications with the second media device 308b.

Spoofing a compatible media device may additionally or alternatively include utilizing other assumed or fabricated information in communications with one or more of the media devices 308a-b. This other assumed or fabricated information may be based on a media device 308. For example, the electronic device 302 may assume and send a manufacturer code indicating a manufacturer that is the same as the manufacturer of the media device 308 in communications with the media device 308. In some configurations, the electronic device 302 may maintain a database of manufacturer codes (e.g., organizationally unique identifiers (OUIs)) and/or other information that can be utilized for spoofing a compatible media device in communications with one or more of the media devices 308. Accordingly, the electronic device 302 may spoof (e.g., impersonate) a compatible media device in communications with one or more of the media devices 308a-b.

The electronic device 302 may include a media device control network management module 312 for managing the media device control networks 306a-b. As described above, the electronic device 302 may functionally decouple the multiple media device control networks 306a-b. For example, the media device control network management module 312 may enable the electronic device 302 to bridge multiple separate or independent media device control networks 306. For instance, the electronic device 302 may act as an intermediary between the first media device 308a and the second media device 308b.

The media device control network management module 312 may manage addresses 368 pertaining to each of the media device control networks 306. For example, the addresses 368 may include physical and/or logical addresses of each of the media devices 308a-b. In some configurations, the addresses 368 may additionally include spoofed addresses (provided by the spoofing module 314, for example). The addresses 368 may be implemented in a look-up table in some implementations. In some configurations, the control signal generation module 304 may utilize the media device control network management module 312 to route signals between the media device control network 306a-b. For example, the control signal generation module 304 may utilize the media device control network management module 312 to generate and send one or more translated control signals to one or more TVs in the first media device control network 306a based on a control signal received from a Blu-ray player in the second media device control network 306b.

Accordingly, the media device control network management module 312 may enable the receipt of information from one media device 308 (e.g., a first media device 308a) in one media device control network (e.g., the first media device control network 306a) and the transmission of information (e.g., the same, different or modified information) to another media device 308 (e.g., the second media device 308b) in another media device control network 306 (e.g., the second media device control network 306b). As described above, the electronic device 302 may send and receive the information acting as (e.g., spoofing) one or more compatible media devices. In other words, the electronic device 302 may allow the media devices 308a-b to exchange control signals regardless of limitations (e.g., capability limitations and/or limitations imposed by media device 308a-b manufacturers).

In some configurations, the electronic device 302 may include one or more drivers 366. The drivers 366 may include functions and/or data relating to one or more of the media devices 308. The control signal generation module 304, the media device control network management module 312 and/or the spoofing module 314 may utilize one or more of the drivers 366. For example, the drivers 366 may include functions and data such as media device type, manufacturer codes, model numbers, signal formats, command formats, command data, media device capability information, protocols and/or other information to enable the electronic device 302 to interoperate compatibly with the media device(s) 308. For instance, the database of manufacturer codes described above may be included in the drivers 366. The drivers 366 may be updatable. For example, the electronic device 302 may download additional drivers 366 and/or driver updates from an external drive (e.g., a Universal Serial Bus (USB) thumb drive) and/or via an Internet connection.

Figure 4:
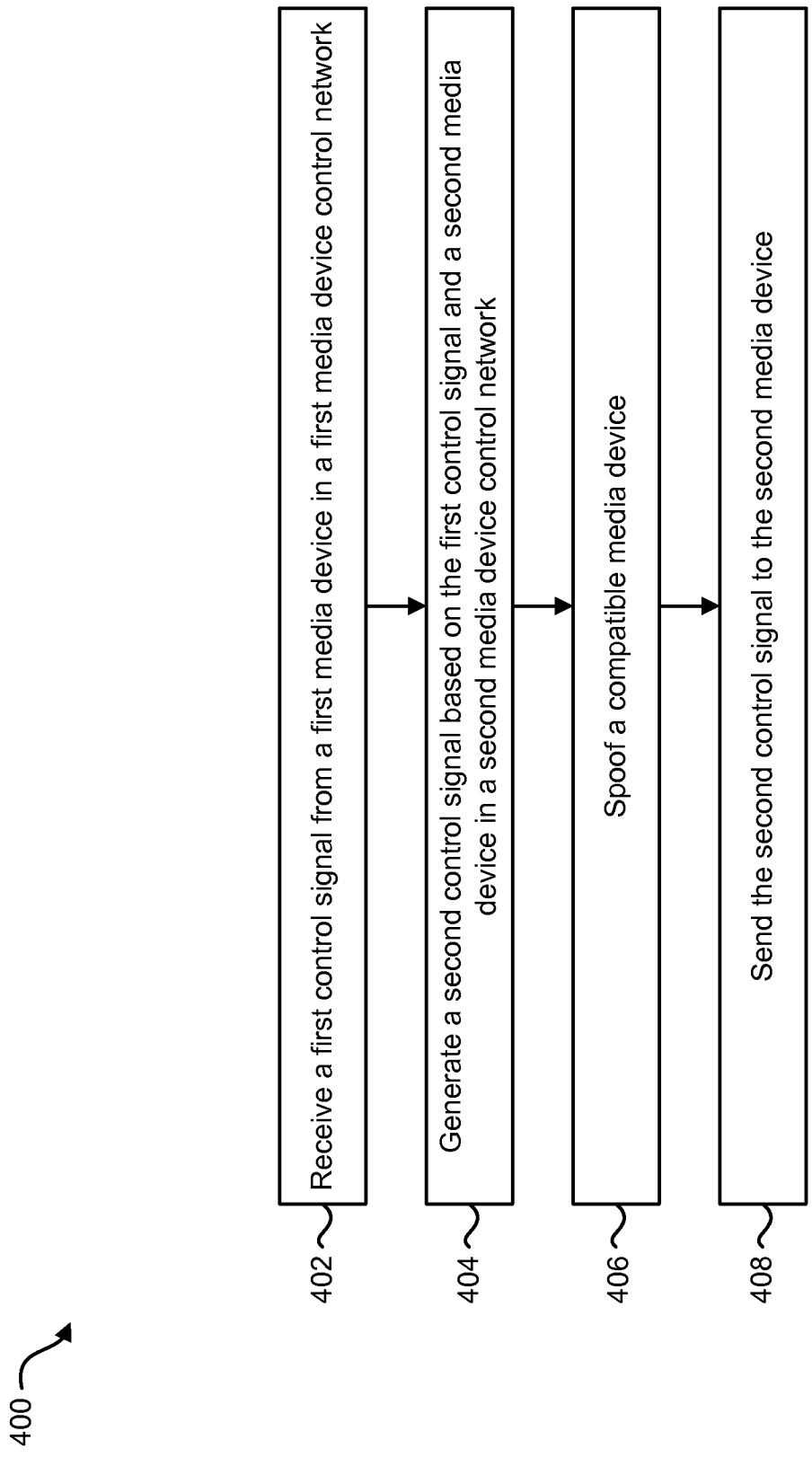
FIG. 4 is a flow diagram illustrating a more specific configuration of a method for controlling media devices by an electronic device.

FIG. 4 is a flow diagram illustrating a more specific configuration of a method 400 for controlling media devices 308a-b by an electronic device 302. The electronic device 302 may receive 402 a first control signal from a first media device 308a in the first media device control network 306a. In some implementations, this may be done as described in connection with FIG. 2.

The electronic device 302 may generate 404 a second control signal based on the first control signal and a second media device 308b in the second media device control network 306b. In some implementations, this may be done as described in connection with FIG. 2.

The electronic device 302 may spoof 406 a compatible media device. For example, the electronic device 302 may communicate with the second media device 308b as a compatible media device. For instance, in generating 404 the second control signal, the electronic device 102 may utilize an assumed address and generate a code (that includes the first three octets of a hardware MAC address, for example) for spoofing 406 a compatible media device to the second media device 308b. For example, the electronic device 302 may spoof 406 a compatible media device (with the same manufacturer as the second media device 308b, for instance) to communicate with the second media device 308b. In this example, the control signal generation module 304 may enable commands to pass from the first media device 308a to the second media device 308b of different manufacturers that would otherwise be incompatible. In some configurations, generating 404 the second control signal may include spoofing 406 a compatible media device (e.g., generating 404 the second control signal and spoofing 406 may be performed concurrently).

An example of spoofing is given as follows. The electronic device 302 may spoof 406 a media display device by communicating as a media display device (e.g., a TV). In this example, a media source device (e.g., a DVD player) may communicate with the electronic device 302 as if the electronic device were a media display device (e.g., a TV). Similarly, the electronic device 302 may spoof 406 a media source device by communicating as a media source device (e.g., a DVD player). In his example, a media display device (e.g., a TV) may communicate with the electronic device 302 as if the electronic device 302 were a media source device (e.g., a DVD player). For instance, the electronic device 102 may spoof a media device that is compatible with a DVD player based on the first control signal (e.g., a play command) by generating a second control signal that is compatible with the DVD player such that a TV may control the a DVD player (which otherwise may be incompatible, for example).

The electronic device 302 may send 408 the second control signal to the second media device 308b. In some implementations, this may be done as described in connection with FIG. 2.

Figure 5:
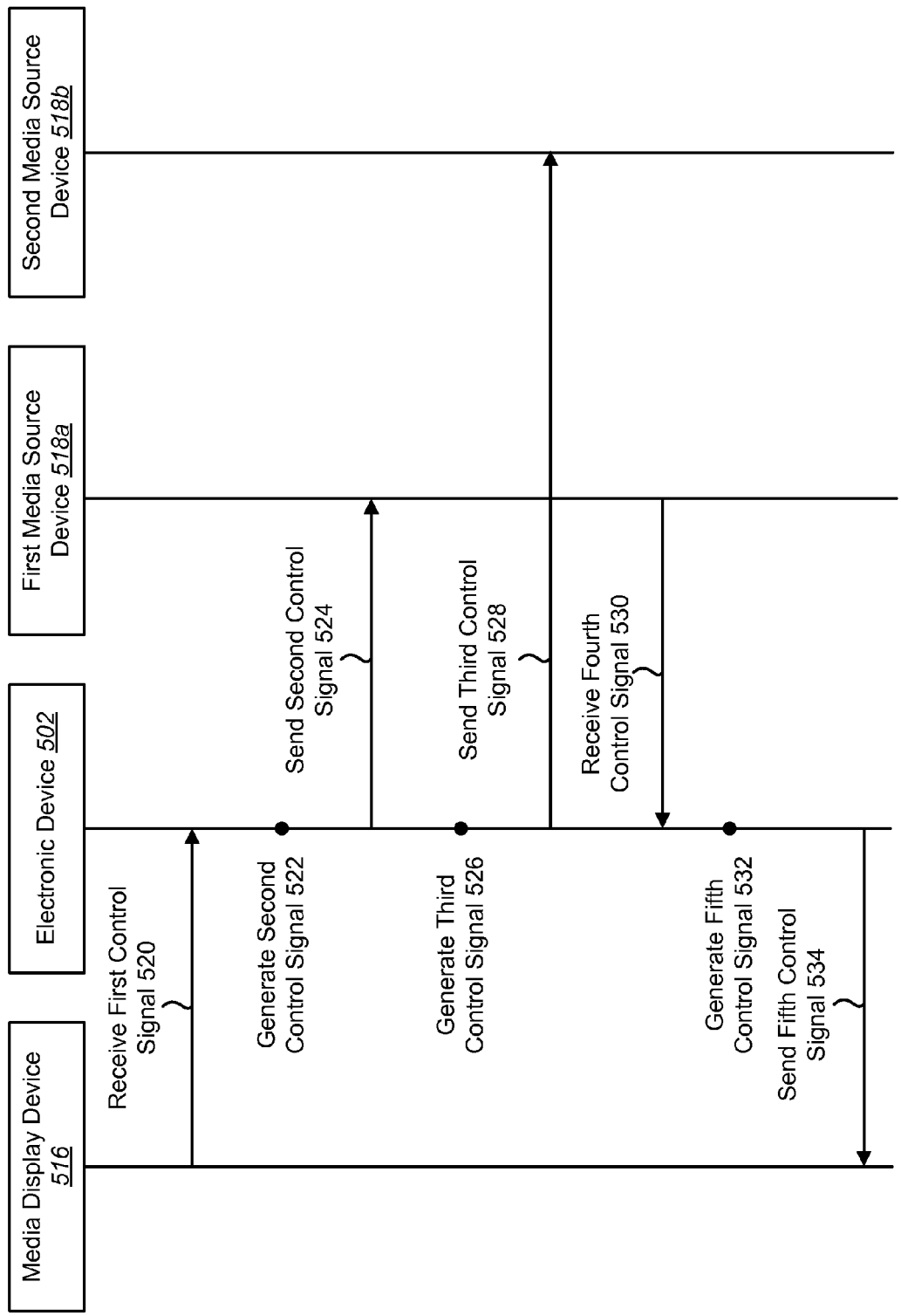
FIG. 5 is a thread diagram illustrating one example of controlling media devices by an electronic device.

FIG. 5 is a thread diagram illustrating one example of controlling media devices. The electronic device 502 may be an example of one or more of the electronic devices 102, 302 described in connection with FIG. 1 and FIG. 3. The media display device 516, the first media source device 518a and the second media source device 518b may be examples of one or more of the media devices 108a-b, 308a-b described in connection with FIG. 1 and FIG. 3.

The electronic device 502 may receive 520 a first control signal. In some implementations, this may be done as described in connection with one or more of FIG. 2 and FIG. 4. For example, the electronic device 502 may receive 520 a first control signal from the media display device 516.

The electronic device 502 may generate 522 a second control signal. In some implementations, this may be done as described in connection with one or more of FIG. 2 and FIG. 4. For example, the second control signal may be based on the first media source device 518a and the first control signal.

The electronic device 502 may send 524 the second control signal to the first media source device 518a. In some implementations, this may be done as described in connection with one or more of FIG. 2 and FIG. 4.

In some implementations, the electronic device 502 may generate 526 a third control signal. Generating 526 a third control signal may be similar to generating a control signal as described in connection with one or more of FIG. 2 and FIG. 4. For example, the electronic device 502 may generate 526 a third control signal that is based on the second media display device 516b and the first control signal.

The electronic device 502 may send 528 the third control signal to the second media display device 516b. In some implementations, this may be done as described in connection with one or more of FIG. 2 and FIG. 4.

The electronic device 502 may receive 530 a fourth control signal. In some implementations, this may be done as described in connection with one or more of FIG. 2 and FIG. 4. For example, the electronic device 502 may receive 530 the fourth control signal from the first media source device 518a. In this example, the fourth control signal may be based on the first media source device 518a.

The electronic device 502 may generate 532 a fifth control signal. In some implementations, this may be done as described in connection with one or more of FIG. 2 and FIG. 4. For example, the fifth control signal may be based on the media display device 516 and the fourth control signal.

The electronic device 502 may send 534 the fifth control signal to the media display device 516. In some implementations, this may be done as described in connection with one or more of FIG. 2 and FIG. 4.

It should be noted what while FIG. 5 depicts three generated control signals (e.g., the second control signal, the third control signal and the fifth control signal) any number of control signals may be generated and sent to any number of media display devices 516 and any number of media source devices 518a-b. For example, a sixth control signal may be received from the first media source device 518a, a seventh control signal may then be generated and sent to a second media display device (not shown).

Figure 6:
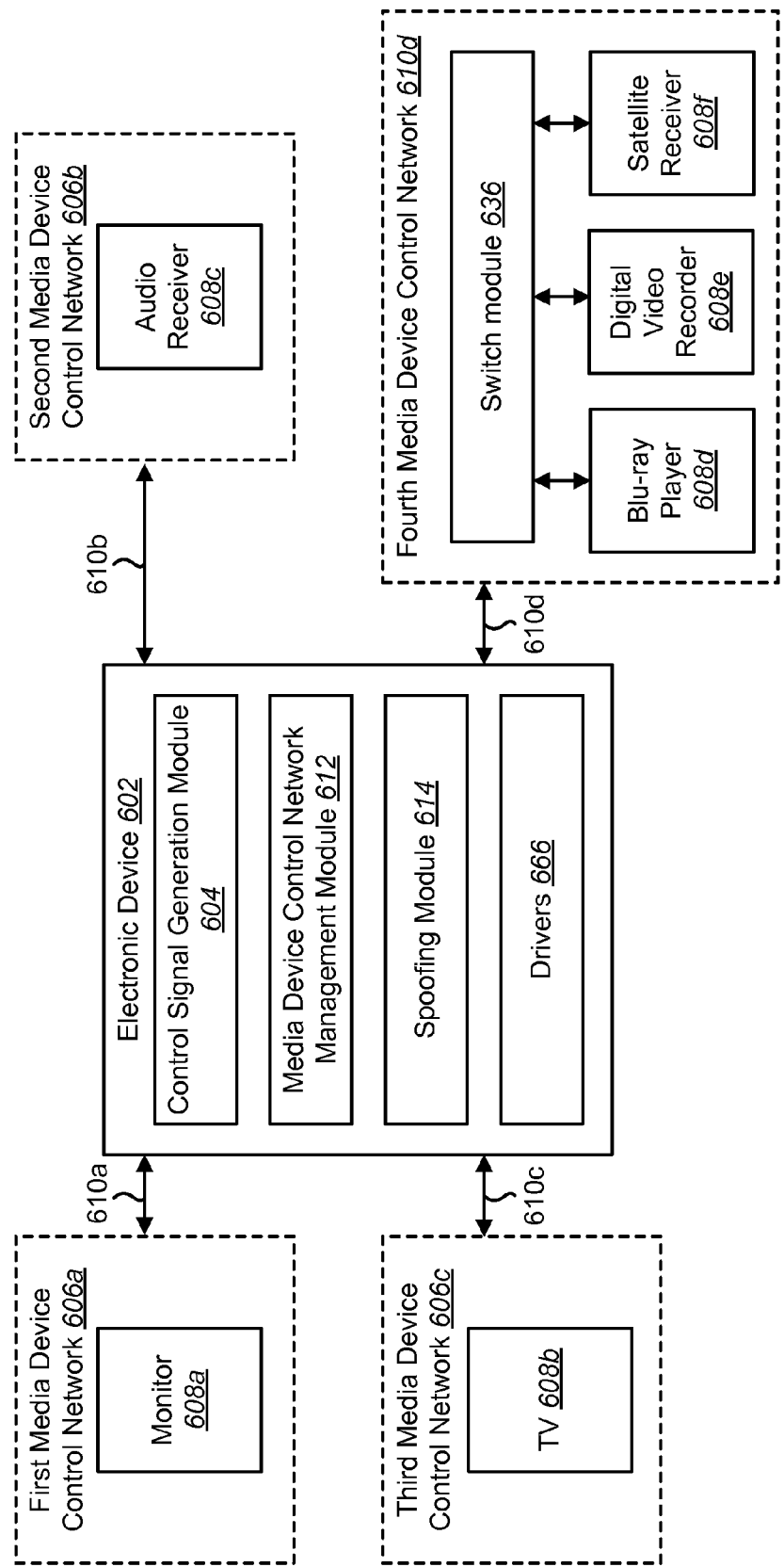
FIG. 6 is a block diagram illustrating another more specific configuration of an electronic device in which systems and methods for controlling media devices may be implemented.

FIG. 6 is a block diagram illustrating another more specific configuration of an electronic device 602 in which systems and methods for controlling media devices 608a-f may be implemented. The electronic device 602 may be an example of one or more of the electronic devices 102, 302 described in connection with FIG. 1 and/or FIG. 3. The electronic device 602 may include a control signal generation module 604, a media device control network management module 612, a spoofing module 614 and/or drivers 666 that may be examples of corresponding elements described in connection with one or more of FIGS. 1 and 3. The electronic device 602 may be connected to one or more media device control networks 606a-d that may be examples of the media device control networks 106a-b, 306a-b described in connection with FIG. 1 and/or FIG. 3. For example, the electronic device 602 may be connected to the media device control networks 606a-d via one or more connections 610a-d that may be examples of the connections 110a-b described in connection with FIG. 1.

As described above, the electronic device 602 may be coupled to media devices that are media display devices such as a monitor 608a and a TV 608b. Similarly, the electronic device 602 may be coupled to media devices that are media source devices, such as an audio receiver 608c, a Blu-ray® player 608d, a digital video recorder (DVR) 608e and a satellite receiver 608f. In some cases, one or more media source devices (e.g., the audio receiver 608c, the Blu-ray® player 608d, the DVR 608e and the satellite receiver 608f) may be coupled together with a switch module 636. The switch module 636 may replicate the signals from the individual media source devices and pass information to the electronic device 602.

In some implementations, the electronic device 602 may be included in each media device control network 606. Accordingly, one or more media display devices (e.g., the monitor 608a and the TV 608b) may be able to access the media source devices (e.g., the audio receiver 608c, the Blu-ray® player 608d, the DVR 608e and the satellite receiver 608f) through the electronic device 602. It should be noted that the electronic device 602 may functionally decouple the media device control networks 606a-d. In other words, the electronic device 602 may treat each media device control network 606a-d as a separate network and may control the information that is transferred between the networks 606a-d so that each media device 608a-f receives the information that the electronic device 602 allows it to receive. For example, the electronic device 602 may not pass along all the information received from a media device 608a-f and/or may add to the information received from a media device 608a-f. It should be noted that the functional decoupling between media device control networks 606a-d may enable multiple media display devices (e.g., the monitor 608a and the TV 608b) to access the same media source devices (e.g., the audio receiver 608c, the Blu-ray® player 608d, the DVR 608e and the satellite receiver 608f).

An example of controlling media devices using the electronic device 602 is given as follows. In one configuration, the electronic device 602 may receive a first control signal (e.g., a deck command, "play" for example) from the monitor 608a in the first media device control network 606a. The electronic device 602 may spoof a compatible media source device or communicate with the monitor 608a as if the electronic device 602 were a compatible media source device (of the same manufacturer as the monitor 608a, for example). The electronic device 602 may generate a second control signal based on the first control signal and based on the Blu-ray® player 608d that the monitor 608a is seeking to communicate with (e.g., control). As described above, the electronic device 602 may spoof a compatible media display device to the Blu-ray® player 608d. Accordingly, the second control signal may be generated to indicate that the electronic device 602 is a media display device (of the same manufacturer as the Blu-ray® ray player 608d). The electronic device 602 may send the generated second control signal to the Blu-ray® player 608d.

It should be noted that the process described above may operate in a reverse order. For example, the electronic device 602 may receive a third control signal from the Blu-ray® player 608d. The electronic device 602 may generate a fourth control signal based on the third control signal and based on the monitor 608a (e.g., based on the physical address of the monitor 608a, for example) that the third control signal is seeking to communicate with (e.g., control). As described above, the electronic device 602 may spoof a compatible media source device to the monitor 608a. Accordingly, the fourth control signal may be generated to indicate that the electronic device 602 is a media source device (of the same manufacturer as the monitor 608a, for example). The electronic device 602 may send the fourth control signal to the monitor 608a.

In some configurations, the electronic device 602 may additionally generate a fifth control signal for the TV 608b based on the third control signal and the TV. For example, the electronic device 602 may spoof a compatible media source device to the TV 608b in generating the fifth control signal. The example described in connection with FIG. 6 illustrates at least two advantages of the systems and methods disclosed herein. For instance, incompatible media devices from different manufacturers may be made compatible and interoperable. Furthermore, multiple media display devices 608a-b may be utilized in an HDMI-CEC context, whereas known HDMI-CEC control limits media control networks to a signal media display device.

Figure 7:
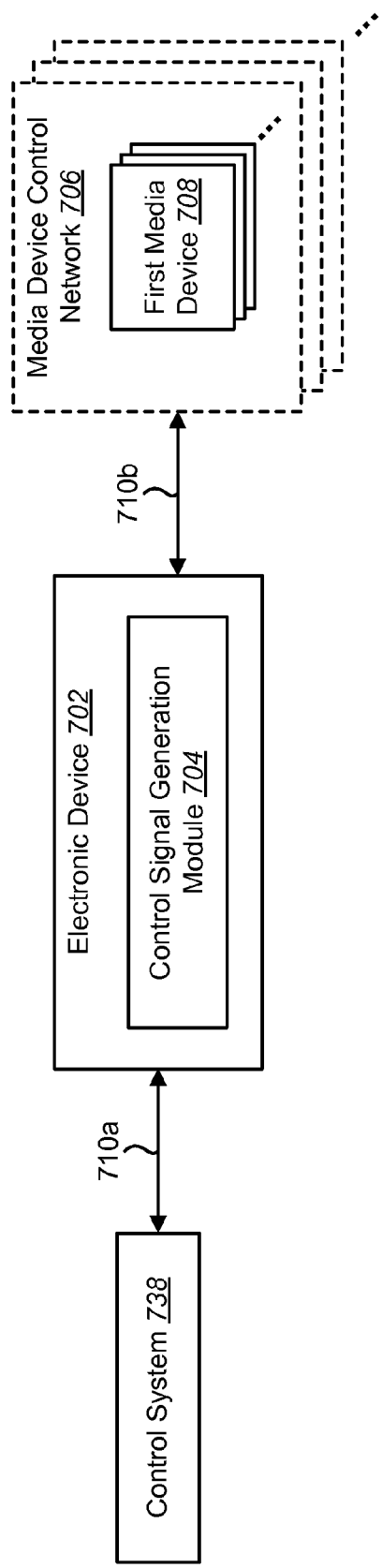
FIG. 7 is a block diagram illustrating another configuration of an electronic device in which systems and methods for controlling media devices may be implemented.

FIG. 7 is a block diagram illustrating another configuration of an electronic device 702 in which systems and methods for controlling media devices 708 may be implemented. The electronic device 702 may be an example of the electronic device 102 described in connection with FIG. 1. The electronic device 702 may include a control signal generation module 704 that may be an example of the control signal generation module 104 described in connection with FIG. 1. In some implementations, the electronic device 702 may enable system-wide CEC control over a network, even when the CEC networks are completely separate. Additionally or alternatively, the electronic device 702 may enable system-wide CEC control even in a system where there are more than one root devices (e.g., media devices such as a TV, for example).

In some cases, the control signal generation module 704 may generate a control signal based on a control indication from a control system 738. Examples of control systems include automation systems (e.g., home automation, building automation), audio/visual control systems (e.g., home entertainment systems), home controllers, etc. A control indication may be a control system 738 command (that may or may not be a CEC command, for example). In some configurations, the control signal generation module 704 may obtain a control indication from a control system 738 through a wired (serial, internet protocol (IP), etc.) or wireless (IP, wireless local area network (WLAN), ZigBee®, Bluetooth®, infrared, radio frequency (RF), etc.) first connection 710a. For instance, the control signal generation module 704 may obtain a control indication from a control system 738 remote control through an internet protocol (IP) network.

The electronic device 702 may then generate a control signal as described above (e.g., based on the control indication and the first media device 708) and send the control signal to the first media device 708 in a media device control network 706 via a second connection 710b.

Figure 8:
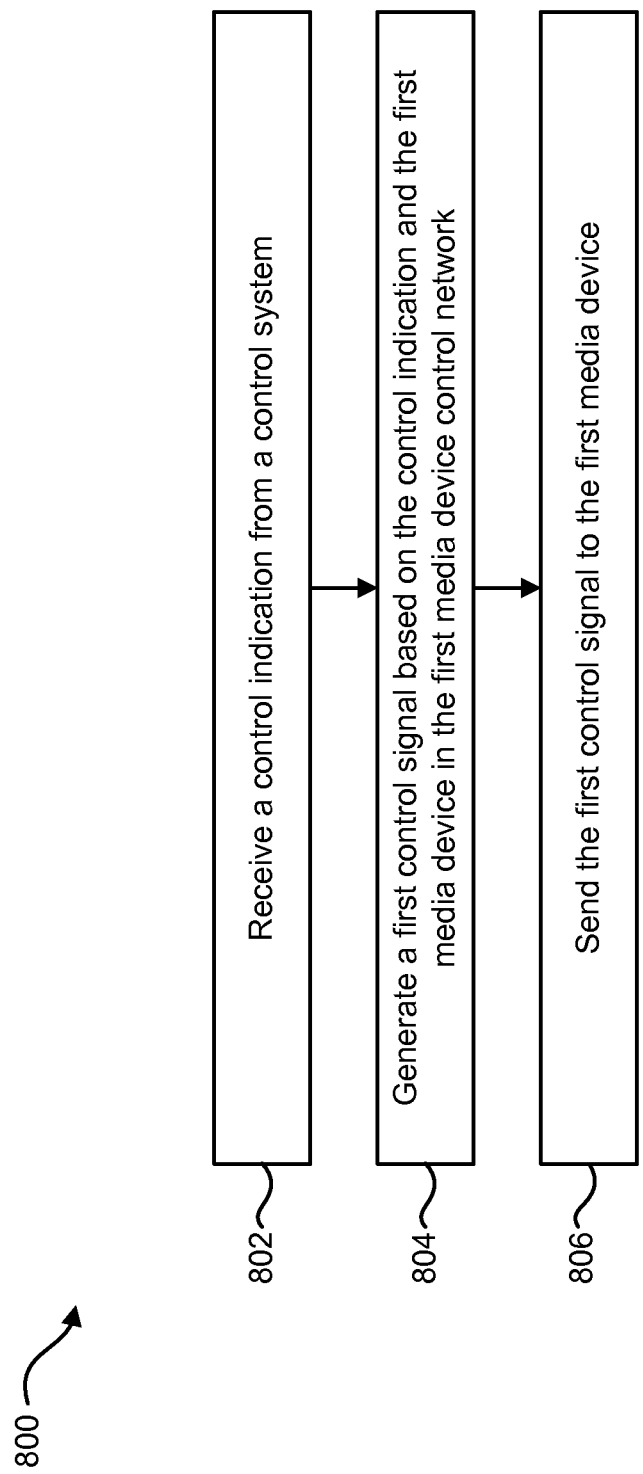
FIG. 8 is a flow diagram illustrating another configuration of a method for controlling media devices by an electronic device.

FIG. 8 is a flow diagram illustrating another configuration of a method 800 for controlling media devices 708. The method may be performed by the electronic device 702. The electronic device 702 may receive 802 a control indication from a control system 738. For example, the electronic device 702 may receive 802 a control indication from a control system 738 remote control. For instance, the control indication may be a deck control command (a "play" command, for example) received via another network (e.g., an IP network).

The electronic device 102 may generate 804 a first control signal based on the control indication and a first media device 708 in a media device control network 706. For example, the electronic device 702 may generate 804 a control signal based on the control indication (e.g., "play") and a Blu-ray® player (e.g., the first media device 708). In some configurations, the electronic device 702 may spoof a compatible media device 708 from the same manufacturer. For instance, in generating 804 the control signal, the electronic device 702 may utilize an assumed address and generate a code (that includes the first three octets of a hardware MAC address, for example) for spoofing a compatible media device. In other words, the electronic device 702 may generate 804 a control signal that may be based on the control indication (e.g., "play") and based on the first media device 708 (using spoofing, for example) so that the control system 738 (via the electronic device 702, for example) may control the first media device 708 (through the CEC network, for example).

The electronic device 702 may send 806 the control signal to the first media device 708. In some implementations, this may be done as described in connection with FIG. 2.

Figure 9:
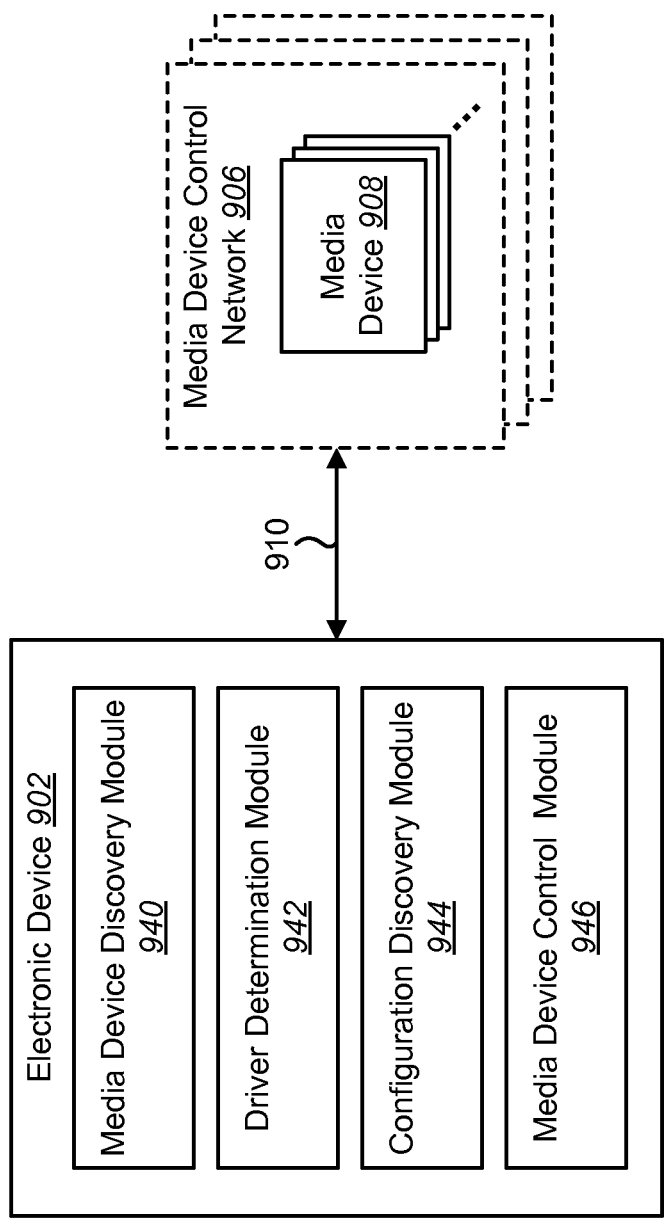
FIG. 9 is a block diagram illustrating one configuration of an electronic device in which systems and methods for discovering a media device configuration in a media device control network may be implemented.

FIG. 9 is a block diagram illustrating one configuration of an electronic device 902 in which systems and methods for discovering a media device 908 configuration in a media device control network 906 may be implemented. The electronic device 902 may be an example of the electronic device 102 described in connection with FIG. 1. The electronic device 902 may be coupled, via a connection 910 that may be an example of the connections 110a-b, to a media device 908 in media device control network 906, which may be examples of corresponding elements described in connection with FIG. 1.

The electronic device 902 may be classified as a control device. In some configurations, the electronic device 902 may be an independent control device. For example, the electronic device 902 may generate commands for one or more media devices 908. In some cases, the electronic device 902 may be a multi-room independent control device (e.g., for independent control of one or more media devices 908 and/or media device control networks 906 in more than one room). For instance, the electronic device 902 may control a Blu-ray® player located in a basement closet to play a movie, a projector in a family room to display the movie and a TV in a kitchen to display the movie. It should be noted that the projector in the family room and the TV in the kitchen may be on different media device control networks 906 and that the electronic device may spoof compatible media devices to the projector and TV, such that the projector and TV behave as if the electronic device 902 is the media source device for the movie. In some cases, the electronic device 902 may not be an audio/visual device. In other words, the electronic device 902 may not produce or present media content.

The electronic device 902 may include a media device discovery module 940 that discovers a media device 908 coupled to the electronic device 902. For example, the media device discovery module 940 may discover a media device 908 when it is connected (e.g., attached, coupled) to a media device control network 906 that includes the electronic device 902. For instance, a media device 908 (e.g., an audio receiver) may be discovered when an HDMI cable (e.g., the connection 910) couples the media device 908 (e.g., the audio receiver) to the electronic device 902. For example, the media device discovery module 940 may discover a media device 908 when the media device 908 broadcasts information (e.g., media device type, manufacturer, model number, specifications, etc., for example). Additionally or alternatively, the media device discovery module 940 may discover a media device 908 by transmitting a request instructing a media device 908 to send information about itself 908 (e.g., media device type, manufacturer, model number, specifications, etc., for example). The media device discovery module 940 may then receive the broadcast information from the media device 908.

The electronic device 902 may also include a driver determination module 942 that determines a driver to use with the media device 908. The driver determination module 942 may determine a driver based on information about the media device 908 (e.g., media device type, manufacturer, model number, specifications, etc., for example). For example, the driver determination module 942 may implement a lookup table to match information received from the media device 908 (via a broadcast, for example) to a list of drivers. In this implementation, the driver determination module 942 may then determine a driver based on the received information and the lookup table.

The electronic device 902 may include a configuration discovery module 944 that discovers a configuration of the media device 908. For example, the configuration discovery module 944 may discover an audio/visual (A/V) configuration of the media device 908. The A/V configuration may include information about the audio and video inputs and outputs of a media device 908 and/or a media device control network 906. For instance, an A/V configuration may indicate that a Blu-ray® player is coupled to a first input of an A/V receiver that is coupled to a third input of a TV (e.g., that the Blu-ray® player has a physical address of 3.1.0.0 and the A/V receiver has a physical address of 3.0.0.0). Similarly, the A/V configuration may indicate that a satellite receiver is coupled to the second input of the A/V receiver (the satellite receiver has a physical address of 3.2.0.0, for example) and that an Apple TV® is coupled to the first input of the TV (the Apple TV® has a physical address of 1.0.0.0, for example). The A/V configuration may be utilized (by the electronic device 902, for example) to route A/V information.

The electronic device 902 may include a media device control module 946 that controls the discovered media device 908. For example, the electronic device 902 may send one or more commands (e.g., CEC commands) to the media device 908 directing the media device 908 to perform certain operations. For example, the media device control module 946 may direct the media device 908 to turn on.

Figure 10:
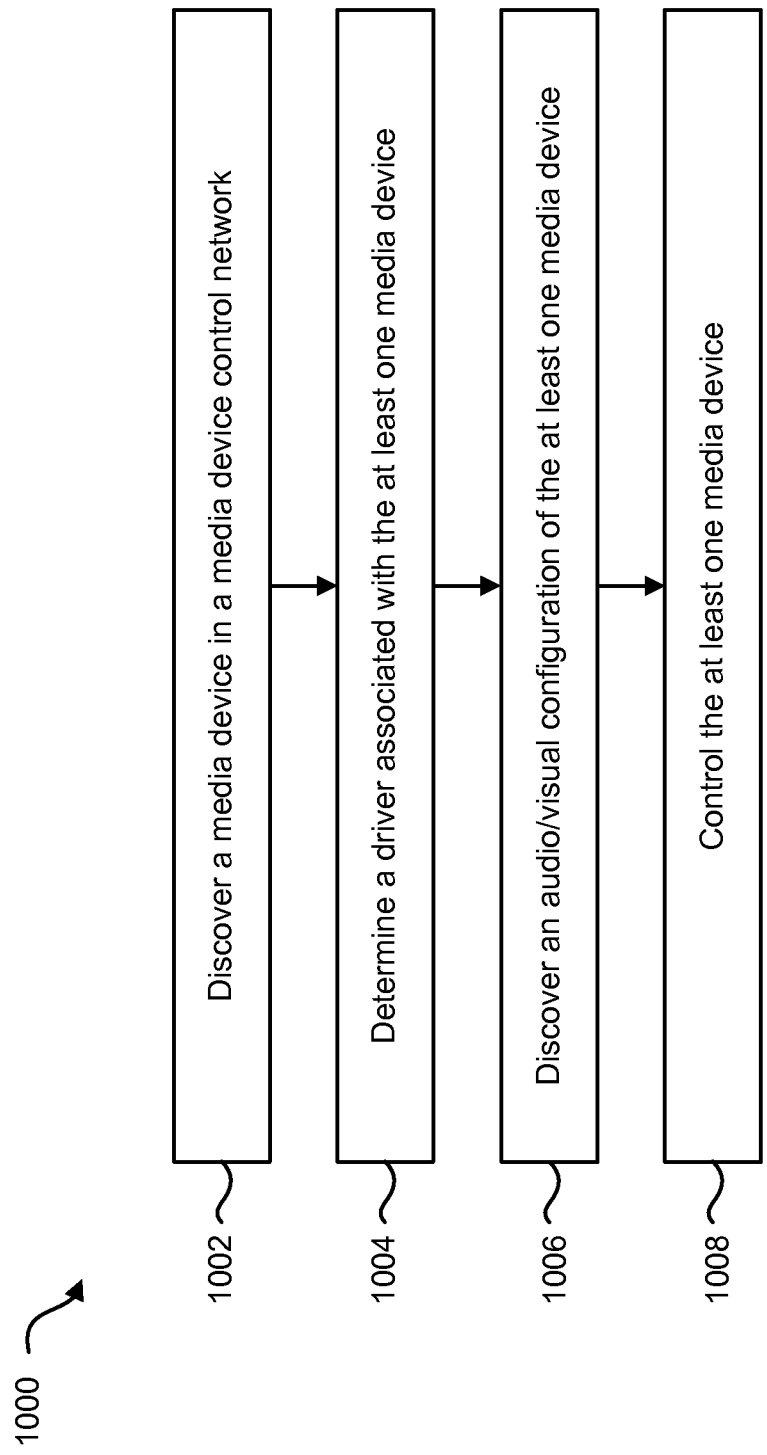
FIG. 10 is a flow diagram illustrating one configuration of a method for discovering a media device configuration in a media device control network.

FIG. 10 is a flow diagram illustrating one configuration of a method 1000 for discovering a media device 908 configuration in a media device control network 906. The method may be performed by the electronic device 902. The electronic device 902 may discover 1002 a media device 908 (e.g., media display device, media source device, media switch device) in a media device control network 906. In some configurations, the electronic device 902 may discover 1002 a media device 908 when it is connected (e.g., attached, coupled) to a media device control network 906. For instance, an audio receiver may be discovered 1002 when the HDMI cable couples the media device 908 to the electronic device 902. In some implementations, when the electronic device 902 is added (e.g., coupled via an HDMI cable) to the media device control network 906, the electronic device 902 may automatically discover the local CEC root device (e.g., a media device such as a TV) and all of the connected source devices. For example, the media device discovery module 940 may discover a media device 908 when the media device 908 broadcasts information. Additionally or alternatively, the electronic device 902 may discover 1002 a media device 908 by generating a request for a media device 908 to send information about itself. The electronic device may then discover 1002 the media device 908 by receiving information from the media device 908. In some cases, discovering 1002 a media device 908 may include obtaining information about the media device 908 (media device type, manufacturer, model number, specifications, etc., for example).

The electronic device 902 may determine 1004 a driver to use with the media device 908. In some configurations, the electronic device 902 may determine 1004 a driver based on information about the media device 908 (e.g., media device type, manufacturer, model number, specifications, etc.). For example, the electronic device 902 may determine 1004 a driver to use by matching information received about a media device 908 with information that is stored in a table (e.g., a lookup table) and selecting the driver (identified in the table, for example) that corresponds to the information about the media device 908. The driver may provide information (e.g., signal formats, command formats, command data, media device capability information, protocols, control signal generation information, spoofing information, media device manufacturer information and/or other information, etc.) that may allow the electronic device 902 to communicate with the media device 908. In some implementations, determining 1004 a driver may include loading the driver on the electronic device 902. The driver may be loaded independently of user input. In other words, the driver may be loaded on the electronic device 902 automatically after the electronic device 902 has determined 1004 a driver to use.

The electronic device 902 may discover 1006 an audio-visual (A/V) configuration of the media device 908. As described above, the A/V configuration may include information about the audio and video inputs and outputs of a media device 908 and/or a media device control network 906. In some configurations, the electronic device 902 may use the A/V configuration for routing A/V information in and/or between one or more media device control networks 906.

The electronic device 902 may control 1008 the media device 908. For example, the electronic device 902 may generate a command based on the driver for and/or A/V configuration of a media device 908. For instance, the electronic device 902 may control 1008 a Blu-ray® player located in a basement closet to play a movie and may control 1008 a projector in a family room and control 1008 a TV in a kitchen to display the movie. Upon being added to the system, for example, the electronic device 902 may automatically discover one or more local CEC root devices (e.g., a TV). The electronic device 902 may also automatically discover and add the connected source devices to the system. This may enable both local control of the devices (no matter what brand of equipment they are). This may also enable control of those devices from any other root device (e.g., another TV) or control interface on the control network.

Figure 11:
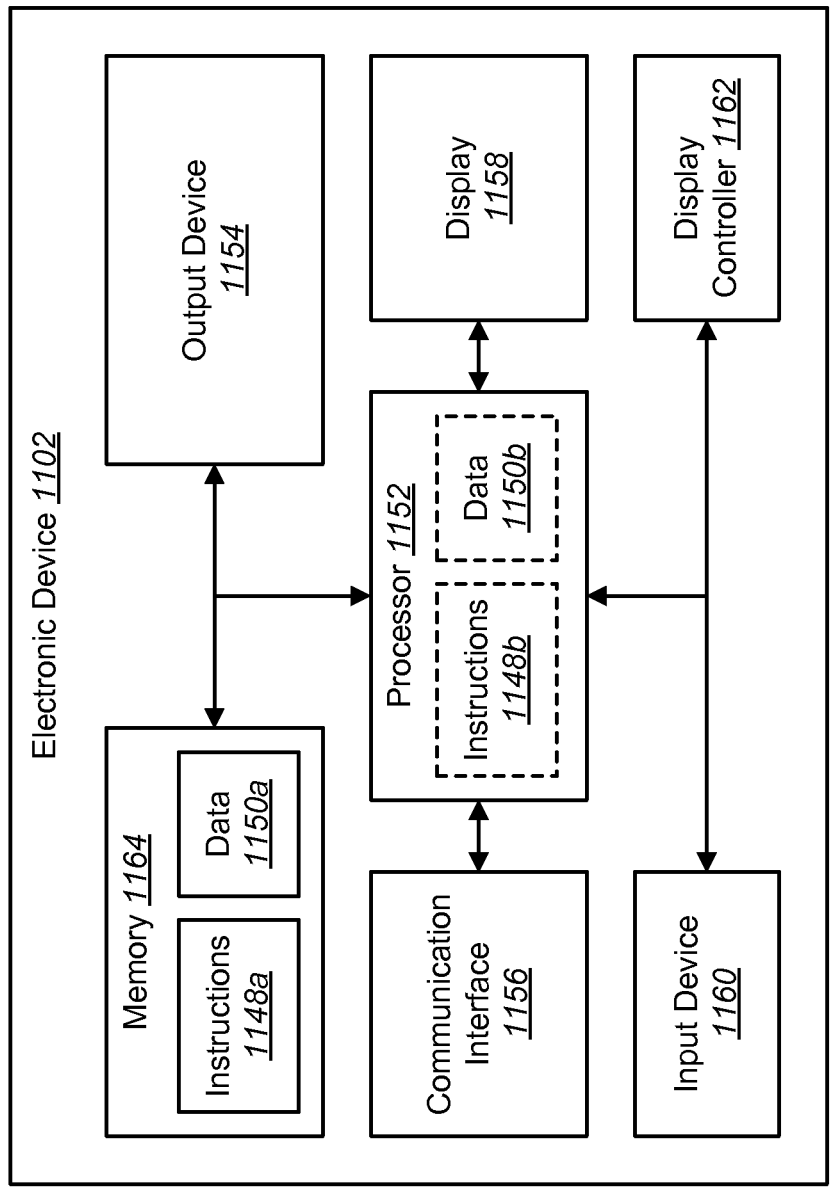
FIG. 11 is a block diagram illustrating various components that may be utilized in a controller and/or an electronic device.

FIG. 11 illustrates various components that may be utilized on an electronic device 1102. One or more of the electronic devices 102, 302, 502, 602, 702 and 902 described previously may be configured similar to the electronic device 1102 illustrated in FIG. 11. For example, the electronic device 1102 may be configured to perform one or more of the methods 200, 400, 800 and 1000 described above. The electronic device 1102 may include a processor 1152 and memory 1164. The processor 1152 may control the operation of electronic device 1102 and may be embodied as a microprocessor, a microcontroller, a digital signal processor (DSP) or other device known in the art. The processor 1152 typically performs logical and arithmetic operations based on program instructions 1148a and/or data 1150a stored within the memory 1164. The instructions 1148a in the memory 1164 may be executable to implement the methods described herein. FIG. 11 illustrates instructions 1148b and/or data 1150b being loaded onto the processor 1152. The instructions 1148b and/or data 1150b may be the instructions 1148a and/or data 1150a (or portions thereof) stored in memory 1164.

The electronic device 1102 may also include one or more communication interfaces 1156 for communicating with other electronic devices. The communication interface(s) 1156 may be based on wired communication technology and/or wireless communication technology, such as Zig-Bee®, WiMax®, WiFi®, Bluetooth® and/or cellular protocols, such as GSM®, etc.

The electronic device 1102 may also include one or more input devices 1160 and one or more output devices 1154. The input devices 1160 and output devices 1154 may facilitate user input/user output. A specific example of an output device is a display 1158. A display controller 1162 may control the display 1158.

Instructions 1148a and data 1150a may be stored in the memory 1164. The processor 1152 may load and execute instructions 1148b from the instructions 1148a in memory 1164 to implement various functions. Executing the instructions 1148a may involve the use of the data 1150a that is stored in the memory 1164. The instructions 1148b and/or data 1150b may be loaded onto the processor 1152. The instructions 1148 are executable to implement the one or more methods described herein and the data 1150 may include one or more of the various pieces of data described herein.

The memory 1164 may be any electronic component capable of storing electronic information. The memory 1164 may be embodied as random access memory (RAM), read-only memory (ROM), magnetic disk storage media, optical storage media, flash memory devices in RAM (Random Access Memory), on-board memory included with the processor, EPROM (Erasable Programmable Read-Only Memory), EEPROM (Electrically Erasable Programmable Read-Only Memory), an ASIC (Application Specific Integrated Circuit), registers and so forth, including combinations thereof. In some configurations, the various components of the electronic device 1102 may be coupled together by a bus system, which may include a power bus, a control signal bus and a status signal bus, in addition to a data bus. However, for the sake of clarity, the various buses are illustrated in FIG. 11 as the bus system.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

As used herein, the term "coupled" and other variations thereof may mean that one element is connected to another element directly or indirectly. For example, if a first element is coupled to a second element, the first element may be connected directly to the second element or may be connected to the second element through another element.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for controlling media devices by an electronic device, comprising:
    receiving a first control signal from a first media device in a first media device control network;
    generating a second control signal based on the first control signal and a second media device in a second media device control network, wherein generating the second control signal comprises spoofing a compatible media device by sending the second media device a manufacturer code that matches a manufacturer code of the second media device and does not match a manufacturer code of the first media device; and
    sending the second control signal to the second media device, wherein at least one of the first control signal and the second control signal is sent over an HDMI connection.

2. The method of claim 1, wherein the first media device is selected from a group consisting of a media display device, a media source device and a media switch device.

3. The method of claim 1, wherein the second media device is selected from a group consisting of a media display device, a media source device and a media switch device.

4. The method of claim 1, wherein the first media device control network is functionally decoupled from the second media device control network.

5. The method of claim 1, wherein the first media device control network and the second media device control network utilize separate addressing parameters.

6. The method of claim 1, wherein at least one of the first control signal and the second control signal is a Consumer Electronics Control (CEC) command.

7. An electronic device for controlling media devices, comprising:
    a processor;
    memory in electronic communication with the processor; and
    instructions stored in the memory, the instructions being executable to:
        receive a first control signal from a first media device in a first media device control network;
        generate a second control signal based on the first control signal and a second media device in a second media device control network, wherein generating a second control signal comprises spoofing a compatible media device by sending the second media device a manufacturer code that matches a manufacturer code of the second media device and does not match a manufacturer code of the first media device; and
        send the second control signal to the second media device, wherein at least one of the first control signal and the second control signal is sent over an HDMI connection.

8. The electronic device of claim 7, wherein the first media device is selected from a group consisting of a media display device, a media source device and a media switch device.

9. The electronic device of claim 7, wherein the second media device is selected from a group consisting of a media display device, a media source device and a media switch device.

10. The electronic device of claim 7, wherein the first media device control network is functionally decoupled from the second media device control network.

11. The electronic device of claim 7, wherein the first media device control network and the second media device control network utilize separate addressing parameters.

12. The electronic device of claim 7, wherein at least one of the first control signal and the second control signal is a Consumer Electronics Control (CEC) command.

13. A method for controlling media devices by an electronic device, comprising:
    receiving a control indication from a control system;
    generating a first control signal based on the control indication and a first media device, wherein generating the first control signal comprises spoofing a compatible media device by sending the first media device a manufacturer code that matches a manufacturer code of the first media device and does not match a manufacturer code of the control system; and
    sending the first control signal to the first media device, wherein at least one of the control indication and the first control signal is sent over an HDMI connection.

14. An electronic device for controlling media devices, comprising:
    a processor;
    memory in electronic communication with the processor; and
    instructions stored in the memory, the instructions being executable to:
        receive a control indication from a control system;
        generate a first control signal based on the control indication and a first media device, wherein generating the first control signal comprises spoofing a compatible media device by sending the first media device a manufacturer code that matches a manufacturer code of the first media device and does not match a manufacturer code of the control system; and send the first control signal to the first media device, wherein at least one of the control indication and the first control signal is sent over an HDMI connection.

* * * * *